United States Patent [19]
Sagan

[11] Patent Number: 5,140,459
[45] Date of Patent: Aug. 18, 1992

[54] APPARATUS AND METHOD FOR OPTICAL RELAY AND REIMAGING

[75] Inventor: Stephen F. Sagan, Plano, Tex.

[73] Assignee: Texas Instruments, Dallas, Tex.

[21] Appl. No.: 400,597

[22] Filed: Aug. 29, 1989

[51] Int. Cl.⁵ .................. G02B 23/00; G02B 17/00
[52] U.S. Cl. .................. 359/434; 359/364; 359/728
[58] Field of Search .......... 350/501, 503, 572, 445, 350/446, 505, 574, 442; 359/727, 728, 730, 365, 364, 362, 434, 732

[56] References Cited

U.S. PATENT DOCUMENTS

| | | | |
|---|---|---|---|
| 3,536,380 | 10/1970 | Ferguson | 350/445 |
| 4,293,186 | 10/1981 | Offner | 350/505 |
| 4,650,315 | 3/1987 | Markle | 350/442 |
| 4,685,777 | 8/1987 | Hirose | 350/505 |
| 4,834,517 | 5/1989 | Cook | 350/505 |
| 4,867,549 | 9/1989 | Sekine | 359/434 |
| 4,896,952 | 1/1990 | Rosenbluth | 350/446 |

FOREIGN PATENT DOCUMENTS

| | | | |
|---|---|---|---|
| 2029718 | 12/1971 | Fed. Rep. of Germany | 350/446 |
| 983342 | 2/1965 | United Kingdom | 350/445 |

Primary Examiner—Bruce Y. Arnold
Assistant Examiner—James Phan
Attorney, Agent, or Firm—Rene' E. Grossman; Richard L. Donaldson

[57] ABSTRACT

An optical reimager (20) is formed by combining a two-element optical relay (24) with a single-element imager objective (22). The relay (24) comprises a refractive element (26) that is used twice and a mirror (28) that provides a real stop. The reimager can be made diffraction-limited by configuring the mirror with an aspheric surface to correct spherical aberration introduced by both the refractive element (26) and the objective (22), and configuring the objective with an aspheric surface to correct non-spherical aberrations (principally astigmatism and coma). The reimager (20) is described in connection with a thermal imaging application requiring telecentricity and a remote entrance pupil.

33 Claims, 2 Drawing Sheets

APPARATUS AND METHOD FOR OPTICAL RELAY AND REIMAGING

TECHNICAL FIELD OF THE INVENTION

This invention relates to optical imaging systems, and more particularly relates to an apparatus and method for performing optical relay and reimaging.

BACKGROUND OF THE INVENTION

Optical relays and reimagers are commonly used in optical systems, and can be formed from a wide variety of optical elements depending upon system design constraints. Optical relays are used to provide additional images and packaging flexibility for an optical system. Optical reimagers are used to translate an intermediate image into a final image (such as at a detector).

A design goal for any optical system is to reduce the number of optical elements Typically, another design goal is to achieve diffraction-limited performance over the field of view, minimizing aberrations that adversely impact image clarity. To achieve diffraction-limited performance, optical systems are configured to correct or compensate for various optical aberrations such as spherical, coma, astigmatism, distortion, petzval and chromatic.

Among the other design factors that are considered in configuring an optical subsystem such as a relay/reimager, are the following:

Stop location—the location of the structural element that determines the useful opening for an optical subsystem;

Pupil location—the location of the image of a stop, and the point where all optical energy appears to be originating; and Telecentricity—an optical configuration in which the location of the pupil for an image or intermediate image appears to be at infinity (i.e., at or near a foci of the corresponding objective element that created the image), so that the optical center rays for the image cones originating from the pupil appear to be parallel.

An example of a prior art relay that uses only two elements is an Offner relay, which consists of two nearly concentric mirrors—a smaller mirror with negative power and a larger mirror with positive power. Optical radiation incident to the larger mirror reflects to the smaller mirror and back to the larger mirror, and is reflected to form an image beyond (in back of) the smaller mirror.

The principle disadvantage of the Offner relay is that, because the smaller (inner) mirror blocks radiation around the optical axis, the image formed must have a minimum offset from the optical axis, reducing the object field. An additional disadvantage is that the final image plane must be located a specific distance behind the smaller mirror substantially equal to the distance between the two mirrors, increasing the size of the relay.

A reimager can be created by combining a relay, such as an Offner relay, with imaging optical elements. Reimagers typically require multiple elements to provide enough degrees of design freedom (design variables) to correct imaging aberrations and achieve diffraction-limited performance.

Accordingly, a need exists for an improved optical relay, both for stand-alone operation and incorporation into a reimager. A satisfactory optical relay would require a minimum number of elements, and would provide sufficient design freedom to correct optical aberrations resulting from combination with a single-element imager objective to provide a diffraction-limited reimager.

SUMMARY OF THE INVENTION

The present invention is an improved optical reimager, achieved with a single element imager objective, a single refractive element and a single reflective element, that ca be made diffraction-limited.

In one aspect of the invention, an optical reimager includes a refractive element (objective) with positive power, a refractive element with positive power, and a reflective element with selectable power (either positive, negative or neutral). These elements are cooperatively located such that incident radiation from an object or intermediate image transmits through the refractive element, and reflects off the reflective element back through the refractive element to form an image of the object or intermediate image (i.e., the refractive element is used twice). The reflective element can form the stop for the optical relay, and the relay can be made symmetrical about that stop. Both the relay and the reimager can be made diffraction limited.

In more specific aspects of the invention, the optical relay includes a meniscus refractive element with two spherical surfaces, and a concave (positive power) mirror element that is aspheric. The stop of the relay is the mirror, and the optical axis is an axis of symmetry. The intermediate and the final image are equally displaced from the optical axis (axis of symmetry). The mirror (stop) can be located at a foci of the refractive element, making the image pupil telecentric.

The reimager is formed by combining the relay with a single-element biconvex imager objective. The objective includes a spheric surface, and an aspheric surface that provides a degree of design freedom that need not be used to correct spherical aberration introduced by the objective. Rather, the aspheric mirror in the relay is used to correct substantially all spherical aberration in the reimager subsystem. Thus, the aspheric surface of the objective provides an additional degree of design freedom available to correct field aberrations (principally astigmatism), and achieve diffraction-limited performance for the reimager.

For an exemplary embodiment, the optical reimager (i.e., the relay combined with an imager element) is used in a thermal imaging system with a detector having a solid state cold shield configuration. Both refractive elements are germanium with an optimum wavelength range of 8 to 12 microns. The mirror stop is located at a foci of the relay's refractive element, so that the image pupil is telecentric, yielding optimum solid state cold shield efficiency at the image plane (i.e. detector array). The relay is symmetrical about the stop, so that the intermediate image also has a telecentric pupil and provides an optimum location for an index or chopper mirror to sample a thermal reference source. The reimager has a remote entrance pupil that provides an optimum location for the image-scanning optics.

The technical advantages of the optical relay/reimager of this invention include the following. The optical relay uses only two elements, a reflective element and a refractive element used twice. The reflective element can form the stop, which can be made the center of symmetry. Using a front refractive element permits both the intermediate image and the image to be formed with substantially no offset from the optical axis (axis of symmetry). The two-element relay can be combined with a single-element imager objective to form a reimager with sufficient degrees of design freedom to achieve diffraction-limited performance over the field of view. The reimager can be folded prior to the relay and/or prior to the final image plane (such as a detector) for packaging flexibility. Both the relay and the reimager (imager/relay) configurations offer diffraction-limited performance with a minimum number of optical elements. The reimager/relay can be configured with telecentric pupils for both the intermediate image and the final image. For the thermal imaging application: (a) the telecentric image pupil (at the detector) yields optimum solid state cold shield efficiency, (b) the intermediate image offers an optimum position for thermal reference sources for detector normalization and gain balance, (c) the stop at the mirror is strategically located between the intermediate image and the detector to provide the same relative illumination for the scene and the thermal reference sources, and (d) the mirror provides an appropriate location for image motion compensation and/or system interlace.

BRIEF DESCRIPTION OF THE DRAWINGS

For a more complete understanding of the present invention, and for further features and advantages, reference is now made to the following Detailed Description, taken in conjunction with the accompanying Drawings, in which.

DETAILED DESCRIPTION OF THE INVENTION

The Detailed Description of the preferred embodiment of the optical relay/reimager of this invention is organized as follows:
1. Exemplary Thermal Imaging Application
2. Prior Art Offner Relay
3. Optical Relay
4. Optical Reimager
5. Alternate Configurations
6. Conclusion As used in this Detailed Description, the term "reimager" means a relay combined with one or more imager (objective) elements.

The preferred embodiment of the relay/reimager is described in connection with its exemplary application as a reimager (imager/relay) subsystem for a thermal imaging system. Such an exemplary reimager application illustrates optical design considerations involved in producing a design specification and configuration for a reimager in accordance with this invention. Those skilled in the art recognize that implementing either an optical relay, or an optical reimager (imager/relay) in accordance with this invention for other applications involves routine design choices in selecting an optimum configuration.

1. Exemplary Thermal Imaging Application. The exemplary thermal imaging application uses a cryogenically cooled linear array of solid state detectors designed for use with infrared radiation in the 8-12 micron wavelength range. The detector array is fabricated with individual solid state cold shields for each detector that limit the cone (or solid) angle viewed by the detector. Scanning optics are used to scan the object across the detector array (creating a scanned final image plane). Thermal reference sources are used for detector normalization and gain balance, requiring the thermal output from these sources to be scanned periodically.

For the exemplary thermal imaging application, an overall design goal was to make the reimager (imager/relay) diffraction limited to achieve optimum system performance. Implementing the reimager in the exemplary thermal imaging system included the following system design requirements.

(a) Telecentricity—Telecentricity was required for the final image pupil (at the detector array), for optimum solid state cold shield efficiency (i.e., the pupil appears to be at infinity so that the image cones for each detector are essentially parallel);

(b) Real Stop—A real stop (rather than a stop image) was required between the intermediate image (from an imager objective element), and the final image (at the detector array), for improved detector normalization (using a thermal reference); and (c) Remote Entrance Pupil—An entrance pupil was required in front of the reimager, for providing an optimum location for a minimum-size scanning optics.

Specific design parameters included the following:

| Effective Focal Length | 1.33 inches |
|---|---|
| f-Number | f/2.4 |
| Detector Format | 0.48 inches |

In this configuration, the entrance pupil is approximately 1.3 inches in front of the objective lens.

Figure 1:
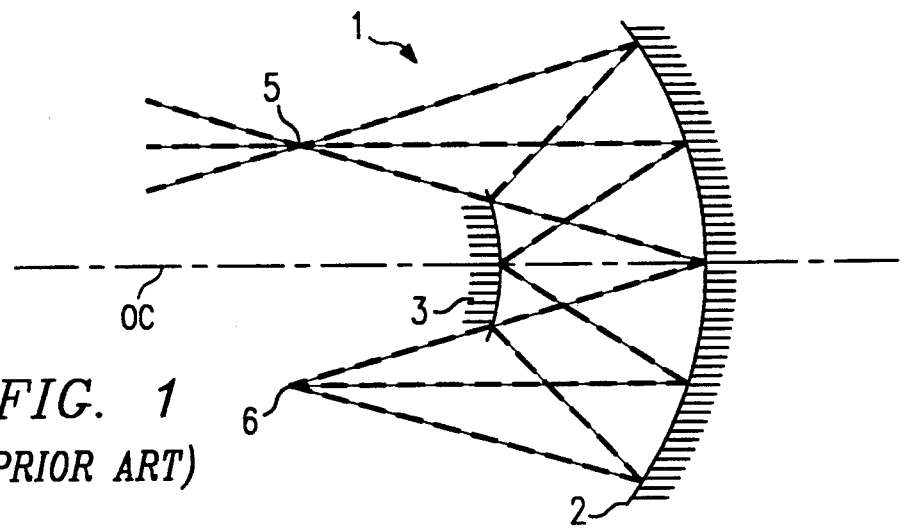
FIG. 1 shows an Offner relay (prior art)

2. Prior Art Offner Relay. An Offner relay is shown schematically in FIG. 1. The relay 1 consists of two nearly concentric mirrors—a larger mirror 2 with positive power, and a smaller mirror 3 with negative power that has a radius one-half that of the larger mirror. The negative mirror forms both a real stop and the center of symmetry, with the positive mirror being used twice.

By locating the smaller mirror 3 at the focus of the larger mirror 2, the relay is configured telecentric, both as to the intermediate image 5 and the final image 6 (i.e., for both images, the pupil is telecentric). Deviations from mirror concentricity allow for a balance of third and fifth order astigmatism.

As described in the Background section of the specification, the disadvantages of the Offner relay (for the thermal imaging and other applications) are the requirements that both the intermediate and final images be offset from the optical axis OA and formed a specific distance in back of the smaller mirror 6.

Figure 2A:
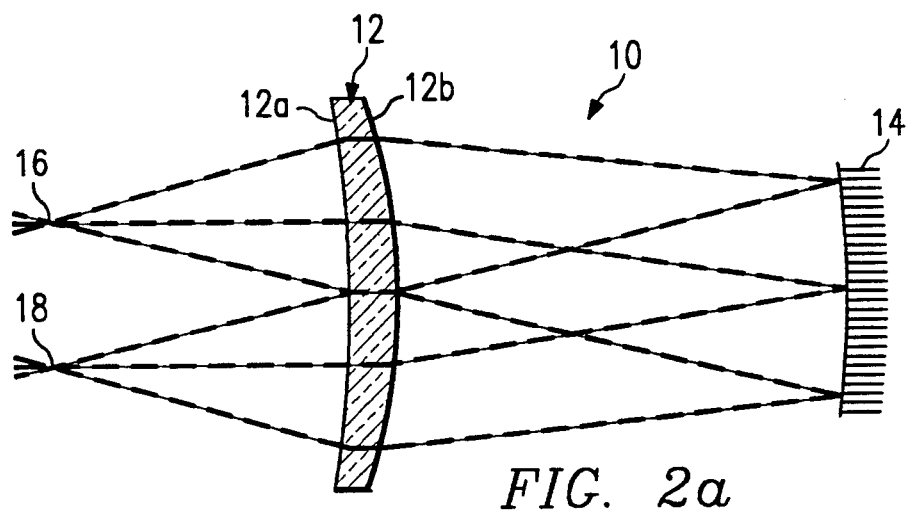
FIGS. 2a and 2b show, respectively, elevation and plan schematic views of the optical relay of the invention.

3. Optical Relay. As shown in FIG. 2a, the optical relay of this invention includes two positive elements—a refractive element 12 and a reflective (mirror) element 14. Refractive element 12 includes a front surface 12a and a back surface 12b. Configuring relay 10 with mirror 14 as a real stop is recommended.

An intermediate image formed at 16 (by optics that are not shown) is relayed through the refractive element 12, reflecting from mirror 14 back through the refractive element to form a final image 18 (such as at a detector array). Thus, refractive element 12 is used twice, with the intermediate image 16 and the final image 18 being located with equal offset from the optical axis. Using a refractive element as the input and output of the relay allows the amount of image offset from the optical axis to be reduced to essentially zero if desired.

Figure 2B:
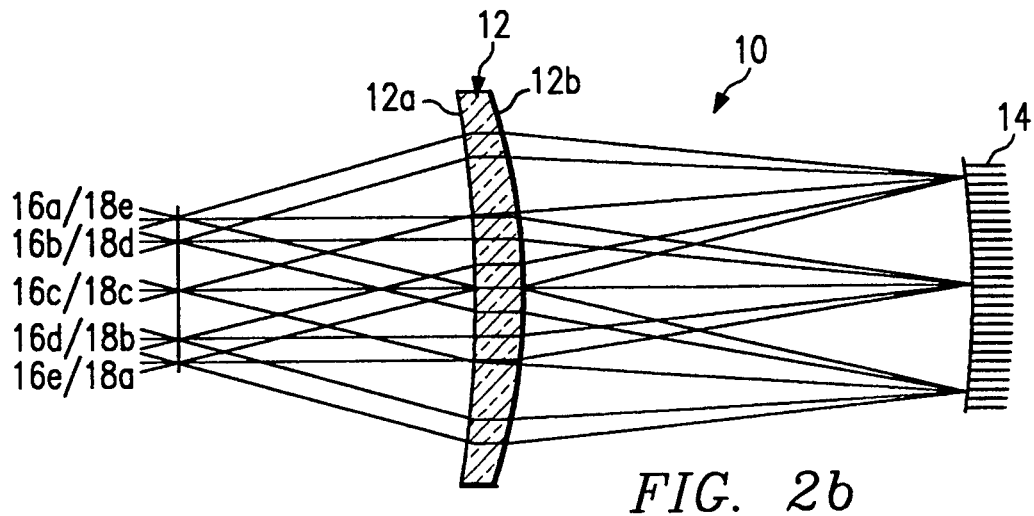

As shown in the orthogonal view in FIG. 2b, the intermediate image is relayed with image reversal. That is, an intermediate image point 16a is relayed to image point 18a, an intermediate image point 16b is relayed to a image point 18b, an intermediate image point 16c at the axis of symmetry is imaged back to a image point 18c, and so on.

For telecentricity, mirror 14 is located at the back foci of refractive element 12, with both the intermediate image and the image being formed in front of the refractive element 12. Thus, the pupil for the image 18 is telecentric; i.e., the image cones 18a–18e have center rays that are essentially parallel such that the pupil (which is the image of mirror stop 14) appears to be at infinity. In this configuration, the relay 10 is symmetrical about mirror stop 14, with the axis of symmetry being the optical axis.

For application in a thermal imaging system operating in the 8–12 micron band, use of germanium for the refractive element 12 is recommended. Germanium is substantially nondispersive over that band; i.e., its index of refraction is substantially constant for those wavelengths. Below that band, germanium becomes dispersive (assuming noncoherent light), which introduces chromatic aberrations, so that a different material would be used. For example, for noncoherent visible light, glass would typically be used for the refractive element.

For basic relay operation, relay 10 is configured with positive power. Typically, refractive element 12 will be configured with positive power, and must have positive power if telecentricity is desired. A positive refractive element 12 can be planoconvex (one planar surface and one convex surface), biconvex or meniscus (one convex surface and one concave surface that together exhibit positive power). Mirror 14 may be concave, planar or convex (subject to the requirement that the relay have positive power), although the size of the image plane may dictate that the mirror have positive power.

In addition to establishing the power for relay 10, the surfaces of refractive element 12 (12a and 12b) and of mirror 14 provide separate degrees of design freedom for correcting various optical aberrations. That is, surface curvatures and aspheric coefficients can be routinely selected to provide the compensating optical corrections necessary to achieve diffraction-limited performance. For those applications in which relay 10 is symmetrical about stop mirror 14, certain optical aberrations (distortion and lateral color) are automatically balanced. If the relay is also made telecentric, then tangential coma is also automatically balanced.

A simple configuration for the refractive and reflective elements of relay 10 would be a planoconvex refractive element 12, with surface 12b being spherically convex, and a flat mirror 14 that forms a real stop. As a practical matter, mirror 14 should probably be made aspheric to correct spherical aberration introduced by the spherical refractive element.

As illustrated in FIGS. 2a and 2b, for a preferred relay to be used in a reimager for a thermal imaging system, refractive element 12 was made meniscus (positive power), with surface 12a being spherically concave, and surface 12b being spherically convex, while mirror 14 was made concave (positive power) with an asphere. With this configuration, relay 10 exhibits essentially no field curvature or astigmatism (with the appropriate selection of refractive and mirror power), and negligible axial color. Mirror 14 was made aspheric to correct spherical aberration. Tangential astigmatism and petzval are corrected by the mirror power. Coma, distortion and lateral color are corrected by system symmetry.

Figure 3:
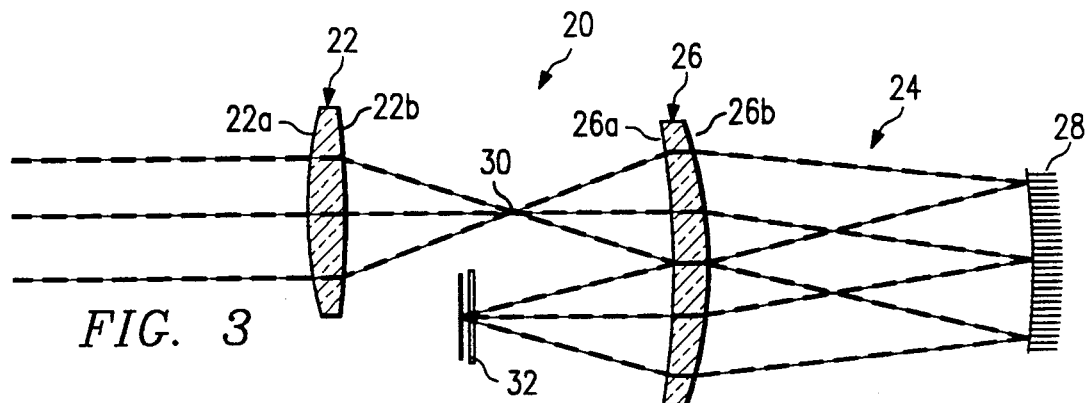
FIG. 3 is a schematic diagram of the reimager of the invention, including a single-element imager objective and a relay.

4. Optical Reimager. As shown in FIG. 3, an optical reimager 20 can be configured by combining an imager formed by a single refractive element 22 as an objective, with a relay 24 configured in accordance with this invention. Objective 22 is biconvex with a front surface 22a and a back surface 22b. Relay 24 includes a meniscus refractive element 26, with front surface 26a and back surface 26b, and a concave mirror 28. Objective 22 and relay 24 both have positive power.

Objective 22 forms an intermediate image 30 which is the optical input to relay 24. Relay 24 functions as described in Section 2, relaying the intermediate image input through refractive element 26, reflecting off mirror 28 back through the refractive element to form the final image output at 32 (the linear detector). Image magnification is controlled by positioning objective 22 relative to the refractive element 26 of the relay. The relay as shown in FIG. 3 is configured unbalanced (i.e. the intermediate image 30 is closer to the refractive element than the final image 32) providing image magnification and some aberration correction.

For the exemplary thermal imaging application, relay 24 is configured with mirror 28 as a real stop located at the back foci of refractive element 26 (making the relay symmetrical about the mirror stop). As a result, reimager 20 is telecentric (i.e. both the image pupil and the intermediate image pupil are telecentric), and has an entrance pupil located at the front foci of objective 22. The entrance pupil provides the optimum location for a minimum-size scanning optics. The intermediate image provides the optimum location for an optical element (such as a chopper or index mirror) to periodically scan a thermal reference (such as during image scan flyback) for detector normalization and gain balance. The mirror stop provides a convenient element for implementing motion compensation and image-scan interlace.

The objective may be configured with negative power, although the intermediate image would be virtual (rather than real) and would be inaccessible for scanning a thermal reference. As is the case with the refractive element 26 of relay 24, for application in a thermal imaging system, using germanium for objective 22 is recommended.

For the exemplary thermal imaging application, the reimager 20 is designed to be diffraction-limited. As described in Section 2, relay 24 can be made diffraction-limited by the appropriate selection of surface curvatures and aspheric coefficient(s). A diffraction-limited reimager 20 can be routinely configured from a diffraction-limited relay 24 in combination with a two-element imager objective, because a two-element objective has sufficient degrees of design freedom to be made diffraction-limited. However, using a single-element objective for imager 22 necessarily introduces aberrations that cannot be corrected solely by configuring the optical surfaces of the objective. Thus, a diffraction-limited reimager 20 can not be achieved by combining such an imager 22 with a diffraction-limited relay 24.

To achieve diffraction-limited performance for reimager 20, the recommended approach is to configure an uncorrected relay with residual optical aberration designed to counterbalance certain optical aberration(s) introduced by the objective. Specifically, the asphere of mirror 28 in relay 24 is configured with aspheric coefficients designed to correct spherical aberration introduced by objective 22. Imager objective 22 is made biconvex, with either front surface 22a or back surface 22b being configured aspheric to provide the degree of design freedom necessary to correct aberrations other than spherical (principally astigmatism and coma), thereby achieving a diffraction-limited reimager.

That is, the aspheric mirror in relay 24 is used to correct spherical aberration introduced by the single-element objective that forms imager 22, as well as spherical aberration introduced by refractive element 26, making the aspheric surface 22a of objective 22 available to provide an additional degree of design freedom. This aspheric surface of objective 22 can then be configured with aspheric coefficients chosen to correct other aberrations (principally astigmatism and coma). Some residual aberrations are corrected by unbalancing relay magnification. The optical surfaces of refractive element 26 are configured to provide appropriate power (and some amount of aberration correction if necessary), and are made spherical to reduce complexity. For applications using germanium, the refractive element 26 will typically be meniscus. The result is a reimager 20 that provides a diffraction-limited image output at detector 32.

In summary, the preferred embodiment of the reimager used in an exemplary thermal imaging application is configured as follows. The reimager is formed by the combination of a relay in accordance with the present invention (i.e., a single refractive element and a single reflective element) and a single-element imager. The reimager is designed for diffraction-limited performance over the field of view. The relay is optically symmetrical about the mirror element, which comprises a real stop. The image pupil at the detector is telecentric for optimum solid state cold shield efficiency. Due to optical symmetry, the intermediate image pupil is also telecentric, and provides an optimum location for periodically scanning a thermal reference source (such as by using a chopper or index mirror). The aspheric mirror in the relay has aspheric coefficients chosen to correct spherical aberrations introduced by both the imager objective and the relay's refractive element. The imager objective includes an aspheric surface to provide the additional degree of design freedom needed to correct aberrations other than spherical, and achieve diffraction-limited performance for the relay. The entrance pupil for the reimager is remote, providing an optimum location for a minimum-size image-scanning optics.

The described configuration for the optical elements that comprise reimager 20 (imager 22 and relay 24) represent design choices based on optimizing optical performance for the exemplary thermal imaging application. Other configurations, both for thermal imaging applications and for other applications, are readily apparent to those skilled in the art, and can be routinely implemented.

5. Alternative Configurations. The reimager of this invention provides substantial packaging flexibility. Two sample configurations are illustrated in FIGS. 4a and 4b.

Figure 4A:
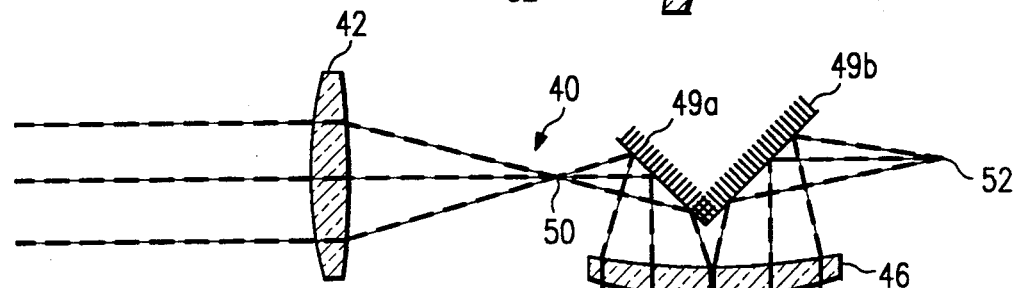
FIGS. 4a and 4b are alternate packaging configurations for the optical reimager.

FIG. 4a shows a reimager 40 with an imager objective 42 and a relay 44 that includes a refractive element 46 and a mirror element 48. Fold mirror 49a folds the intermediate image 50 through the relay (i.e., through the refractive element 46), while fold mirror 49b folds the relay output to a detector 52.

Figure 4B:
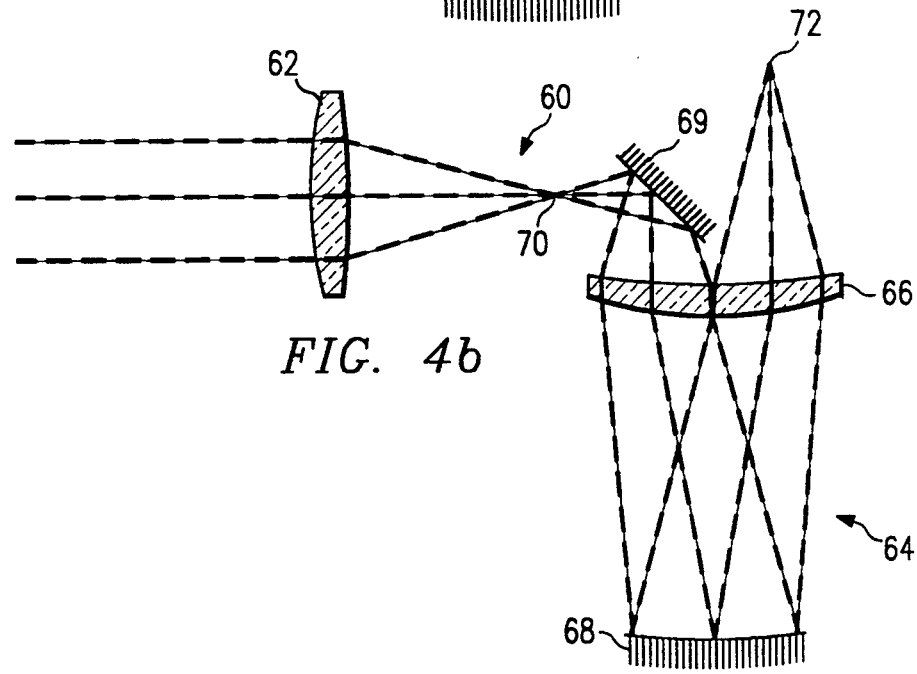

FIG. 4b shows a configuration in which only the intermediate image is folded. A reimager 60 includes an objective 62 and a relay 64 with a refractive element 66 and a mirror 68. The fold mirror 69 folds the intermediate image 70 through the relay with optical output appearing at the final image plane 72.

6. Conclusion. The relay of this invention uses two elements—a refractive element that is used twice and a reflective element that can be used as a real stop. The relay can be combined with a single-element objective to obtain a diffraction-limited reimager.

For a typical relay, the refractive element will have positive power with a spherical surface or surfaces. The mirror element will be configured with an aspheric surface to correct for spherical aberration introduced by the refractive element. In addition, depending upon the size of the image plane, the mirror may have to be configured with positive power.

For a typical reimager, the objective will have positive power and an aspheric surface to provide a degree of design freedom (unless aperture and field of view are small enough that significant off-axis aberrations are not introduced). The aspheric coefficient(s) for the aspheric surface of the relay mirror will be selected to correct spherical aberrations introduced by the objective, in addition to spherical aberrations introduced by the refractive element of the relay (i.e., the relay alone would be uncorrected to compensate for optical aberrations introduced by objective).

What is claimed is:

1. An optical reimager, comprising:
   an objective element that is refractive;
   a refractive element with positive power;
   a reflective element;
   said objective, refractive and reflective elements being cooperatively located such that incident radiation transmits through said objective element and through said refractive element, reflects from said reflective element back through said refractive element, and forms a final image.

2. The reimager of claim 1, wherein said objective element has positive power such that incident radiation is focused to form a real intermediate image.

3. The reimager of claim 2, wherein said objective includes at least one convex surface.

4. The reimager of claim 3, wherein the convex surface of said objective is selectively aspheric to compensate for optical aberrations.

5. The reimager of claim 4, wherein said reflective element is selectively aspheric to correct spherical aberration introduced by said objective and said refractive element.

6. The reimager of claim 2, wherein said reflective element forms a stop for the reimager.

7. The reimager of claim 6, wherein said reflective element is located at a foci of said refractive element such that the reimager is substantially telecentric.

8. The reimager of claim 7, wherein the reimager is symmetrical about said reflective element.

9. The reimager of claim 8, wherein an entrance pupil for the reimager is in front of the reimager.

10. The reimager of claim 1, wherein said refractive element is meniscus, with two substantially spherical surfaces.

11. The reimager of claim 1, wherein said reflective element is selectively aspheric to correct optical aberrations introduced by said refractive element.

12. The reimager of claim 11, wherein said reflective element has aspheric coefficients selected to correct optical aberrations introduced by said object element and said refractive element.

13. The reimager of claim 12, wherein said reflective element as aspheric coefficients selected to correct spherical aberration introduced by said objective element and said refractive element.

14. The reimager of claim 13, wherein said reflective element has positive power.

15. A thermal imaging system, including an optical reimager subsystem, comprising:
   an objective element that is refractive with positive power;
   a refractive element with positive power;
   a reflective element;
   a detector;
   said objective, refractive and reflective elements and said detector being cooperatively located such that incident radiation from an object is focused by said objective element to form an intermediate image and then transmits through said refractive element to reflect from said reflective element back through said refractive element to form a final image of the object at said detector.

16. The imaging system of claim 15, wherein said objective includes at least one convex surface.

17. The imaging system of claim 16, wherein the convex surface of said objective is selectively aspheric to compensate for optical aberrations.

18. The imaging system of claim 17, wherein said reflective element is selectively aspheric to correct spherical aberration introduced by said objective and said refractive element.

19. The imaging system of claim 15, wherein said refractive element is meniscus, with two substantially spherical surfaces.

20. The imaging system of claim 15, wherein said reflective element is aspheric to correct optical aberrations introduced by said refractive element.

21. The imaging system of claim 20, wherein said reflective element has aspheric coefficients selected to correct optical aberrations introduced by said objective element and said refractive element.

22. The imaging system of claim 21, wherein said reflective element has positive power.

23. The imaging system of claim 22, wherein the reimager subsystem is symmetrical about said reflective element.

24. The imaging system of claim 15, wherein said reflective element forms, a stop for the reimager subsystem.

25. The imaging system of claim 24, wherein said reflective element is located at a foci of said refractive element, such that the pupil of the image is substantially telecentric.

26. The imaging system of claim 24, wherein an entrance pupil for the reimager subsystem is in front of the reimager subsystem.

27. A method of implementing an optical reimager, comprising the steps of:
   forming an intermediate image using an objective element that is refractive;
   refracting the intermediate image with a positive power refractive element;
   reflecting the refracted radiation; and
   refracting the reflected radiation with said positive power refractive element to form an image.

28. The method of claim 27, wherein the objective element includes an aspheric surface to correct optical aberrations.

29. The method of claim 27, wherein the steps of refracting the radiation that forms the intermediate image and refracting the reflected radiation are accomplished by using a refractive element that is meniscus, with two substantially spherical surfaces.

30. The method of claim 27, wherein the step of reflecting is accomplished by using a reflective element that is aspheric to correct optical aberrations.

31. The method of claim 30, wherein the step of forming an intermediate image is accomplished by an objective element with an aspheric surface to correct optical aberrations.

32. The method of claim 31, wherein said reflective element corrects primarily spherical aberrations, and said objective element corrects primarily non-spherical aberrations.

33. The method of claim 32, wherein said reflective element has positive power.

* * * * *